United States Patent [19]

Smith

[11] Patent Number: 4,481,870
[45] Date of Patent: Nov. 13, 1984

[54] TRAILER FOR TRANSPORTING LIVING FOWL

[76] Inventor: G. D. Smith, P. O. Box 188, Fairview, N.C. 28730

[21] Appl. No.: 378,137

[22] Filed: Jun. 14, 1982

[51] Int. Cl.³ .............................................. B60H 1/24
[52] U.S. Cl. .............................................. 98/6; 98/10
[58] Field of Search ........................ 98/6, 10, 14, 33 R, 98/33 A, 39, 40 C, 56; 220/1.5, 1 V; 62/239, 418; 165/41, 42, 43; 248/500, 503

[56] References Cited

U.S. PATENT DOCUMENTS

| 1,938,889 | 12/1933 | Bloom | 98/33 A |
| 2,301,603 | 11/1942 | Woodruff | 220/1.5 |
| 2,610,567 | 9/1952 | Davis | 98/10 |
| 3,294,034 | 12/1966 | Bodenheimer et al. | 220/1.5 X |
| 4,122,761 | 10/1978 | Westin et al. | 220/1.5 X |
| 4,300,441 | 11/1981 | Dicks | 98/40 C |

FOREIGN PATENT DOCUMENTS

| 2236004 | 2/1973 | Fed. Rep. of Germany | 62/418 |
| 882307 | 5/1943 | France | 98/40 C |

Primary Examiner—Harold Joyce
Attorney, Agent, or Firm—David M. Carter

[57] ABSTRACT

There is provided an enclosed trailer for transporting stacked cartons containing living fowl. The trailer includes an elongated enclosure having an elongated air duct running along the length of the floor of the trailer. The air duct has a plurality of holes pointed upwardly for forcing air along the length of the trailer towards the ceiling. The cartons are adapted to be stacked and arranged in at least two parallel rows along the length of the floor in a closely spaced parallel arrangement. The air duct is located so as to provide forced air in the spacing between the parallel rows of cartons so that the probability of survival of the fowl during transport is increased.

6 Claims, 3 Drawing Figures

TRAILER FOR TRANSPORTING LIVING FOWL

BACKGROUND OF THE INVENTION

This invention relates to an improved enclosed trailer. More particularly, it relates to an improved enclosed trailer for transporting stacked cartons of living fowl.

One of the chief problems in transporting large numbers of living fowl, such as baby chicks, is the removal of excess heat from their immediate environment to ensure that a large number will survive the transport. Obviously, transporting fowl in open-air trailers while permitting a great deal of air circulation during transport is not acceptable because of the direct exposure of the fowl to the elements. Trailers have been devised which are constructed so that the side walls have many openings to permit the free flow of air.

Recently more sophisticated trailers have been designed which are substantially closed but provide for a controlled environment during the transport of the fowl. These types of trailers include in-wall and overhead duct work and fans for circulating air. The air ducts may be connected to various sources of forced air, such as air-conditioners, fans and in some cases forced air heaters. The air would normally be circulated through open grates in a false bottomed floor of the trailer and between rows of fowl. The fowl are contained in stacked cartons with parallel rows of the cartons running along the length of the trailer in closely spaced relationships. Even with the more sophisticated controlled environment systems hot spots have developed where the air circulation is poor, particularly in the middle rows of the stacked cartons. It has been found that many of the fowl in those particular areas will not survive a long transport.

OBJECTS OF THE INVENTION

It is one object of this invention to provide an improved enclosed trailer for the transport of fowl.

It is another object to provide an enclosed trailer for transporting fowl utilizing an improved air circulation system.

It is another object to provide an enclosed trailer for transporting fowl which increases the probability of survival of the fowl during transport.

SUMMARY OF THE INVENTION

In accordance with one form of this invention there is provided an enclosed trailer adapted to transport a plurality of stacked cartons containing living fowl. The trailer includes an elongated enclosure defined by a ceiling, a floor, two side walls, a front wall and a rear door or doors. An elongated air duct is connected to a source of forced air. The air duct runs substantially the entire length of the floor and has a plurality of holes therein pointed upwardly for forcing air along the length of the enclosure up from the floor towards the ceiling. The cartons are stacked and arranged in at least two parallel rows along the length of the floor. A mechanism is provided for maintaining a close spacing between the parallel rows of the cartons. The duct is located with respect to the cartons for providing forced air between parallel rows of the cartons so that the probability of survival of the fowl during transport is increased.

BRIEF DESCRIPTION OF THE DRAWINGS

The subject matter which is regarded as the invention is set forth more particularly in the appended claims. The invention itself however together with further objects and advantages thereof may be better understood by referring to the following description taken in conjunction with the accompanying drawings in which:

DESCRIPTION OF THE PREFERRED EMBODIMENT

Figure 1:
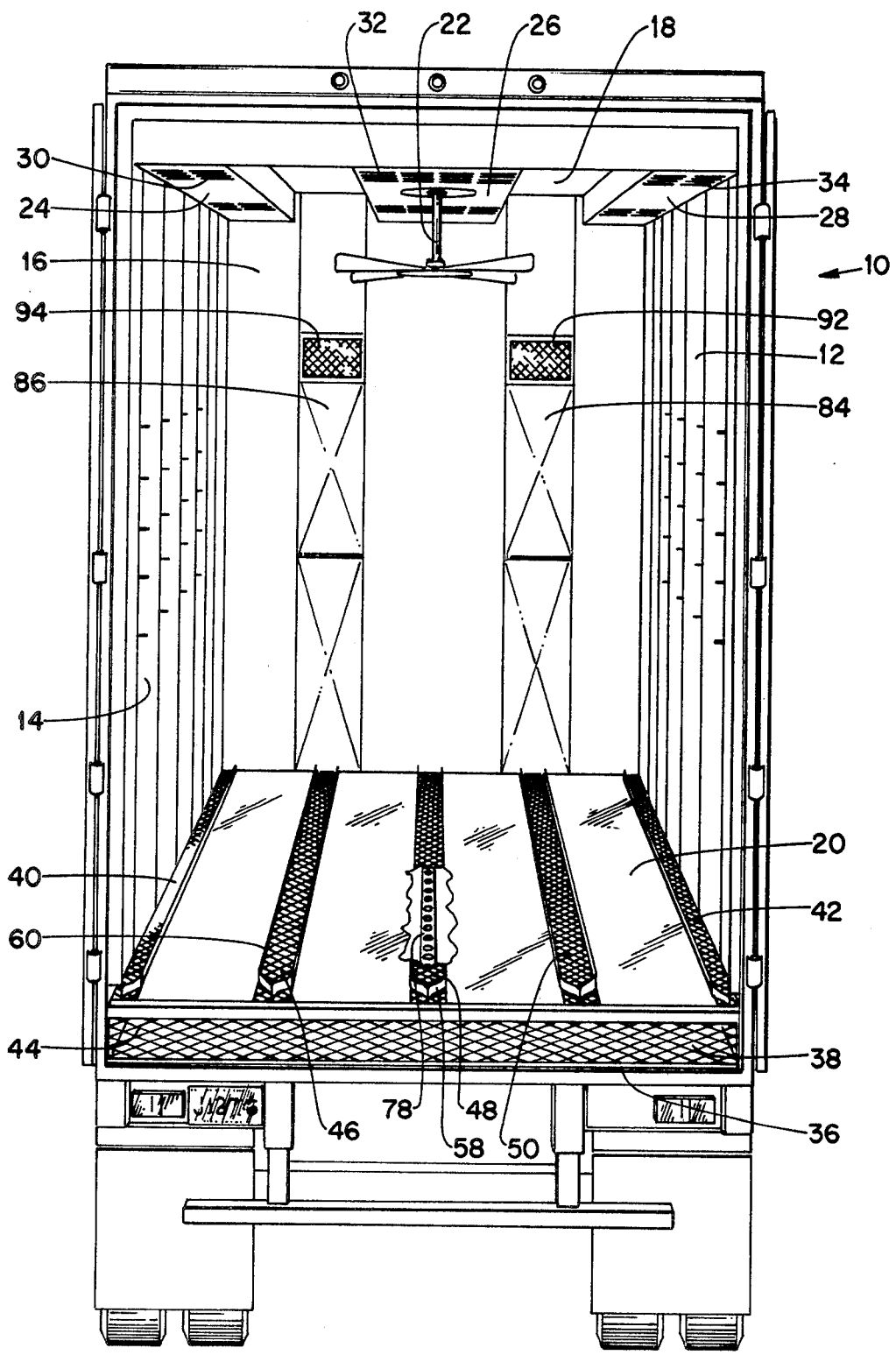
FIG. 1 is an end view of the improved enclosed trailer with the rear doors removed.

Referring now more particularly to FIG. 1, there is provided tractor-trailer 10 having sidewalls 12 and 14, end wall 16, ceiling 18 and floor 20 forming an enclosure. The rear doors (not shown) have been removed for simplification. As can be seen, various devices are provided for the movement of air within the trailer. Normally three overhead fans are mounted on the ceiling of the truck for circulating air along the perimeter of the enclosure. Air ducts 24, 26 and 28 are mounted on the ceiling of the enclosure. These air ducts include openings 30, 32 and 34, respectively. Air duct 26 is one of the main air supplies for the enclosure, while air ducts 24 and 28 normally serve as a return air for the air supply (not shown). The air supply will normally be a fan or system of fans but could also be an air-conditioning system or, in some cases, a forced air heating device. The floor 20 is raised several inches from the bottom 36 of the trailer forming air space 38. The air which is moved by the fans and duct openings also circulates in space 38 normally by coming into space 38 through openings 40 and 42, which are along the junction of the side walls and floor, as well as through the wire mesh 44 located at the end of the enclosure. There are provided three openings 46, 48 and 50 in the floor of the enclosure for permitting this air which is forced into space 38 to travel upwardly from the floor.

Figure 3:
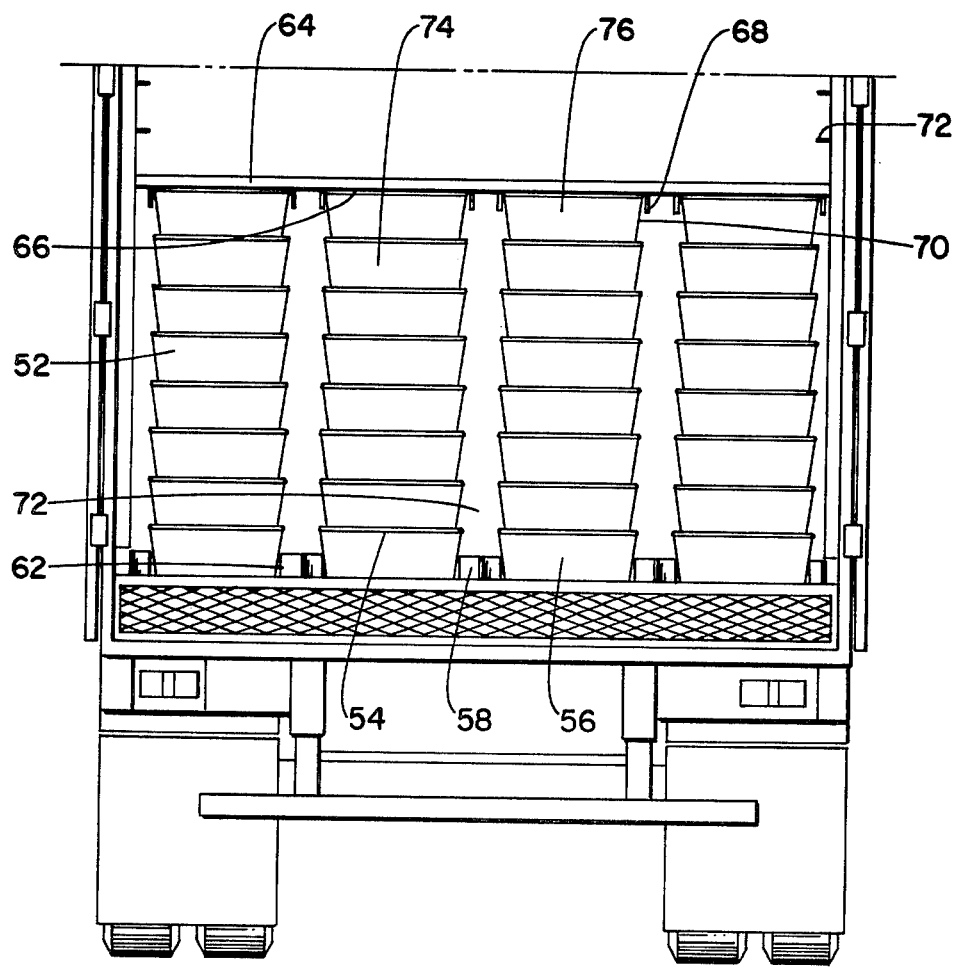
FIG. 3 is a partial end view of the improved enclosed trailer of FIG. 1 showing the cartons of fowl in the trailer.

Referring now to FIG. 3, it can be seen that cartons 52 are stacked on top of one another and arranged in parallel elongated rows along the length of the enclosure. Each of the rows, for example rows 54 and 56, are separated and maintained in a close spatial relationship with one another by flanges 58 which also run the length of the enclosure along the edges 60 of the floor openings. The raised flanges abut against the side walls 62 of the bottom carton in each stack. In order to keep the stacked cartons from shifting, bar 64 contacts the tops 66 of the stacked cartons and flanges 68 extend from the bar and make contact with the side walls 70 of the top carton in each stacked row. The bar is removably attached to the side walls of the enclosure by pins 72. A bar is provided for each row along the width of the enclosure.

Figure 2:
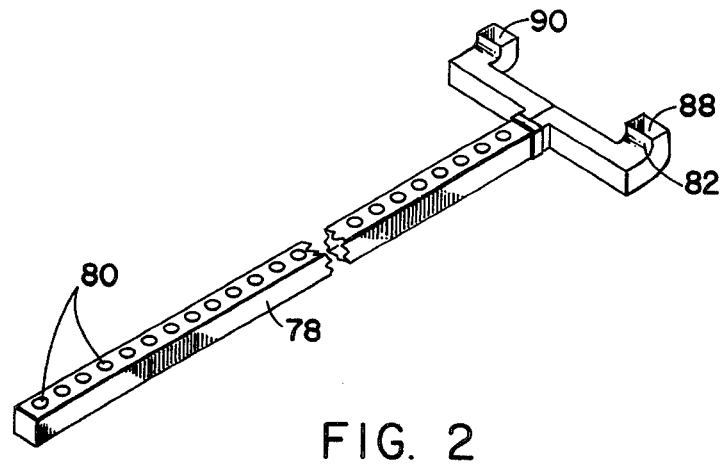
FIG. 2 is a partial pictorial view of the improved air movement system of FIG. 1.

It was found that the air movement in space 38 coming up through openings 46, 48 and 50 in the floor of the enclosure was not sufficient to properly ventilate the fowl which are in the cartons 52. Particularly, the air coming through opening 58 was not sufficient to ventilate space 72 between the enter rows 74 and 76 of cartons, more than likely because opening 48 was so far removed from the source of forced air. It was found that many of the fowl being transported in these mid rows 74 and 76 were not surviving transport. To overcome this problem an air duct 78 is extended longitudinally in space 38 between floor 20 and the bottom 36 of the trailer. The structure of the duct may be better seen in reference to FIG. 2. The top of the duct includes a plurality of holes 80 which point upwardly through opening 48 for forcing air in an elongated curtain into space 72 between the rows of fowl 74 and 76. Forced air is supplied to this duct 78 through a duct-split mechanism 82 coupled to one end of the duct 78 and further coupled to air ducts 84 and 86, respectively, at junctions 88 and 90. Air ducts 84 and 86 are mounted on the front wall of the enclosure and include openings 92 and 94, again for further circulating the air within the enclosure. Air ducts 84 and 86 are further connected to a source of forced air in the same manner as duct 26. Thus by adding air duct 78 a major problem associated with the transport of fowl has been overcome without the need to radically modify the design of the trailer, particularly in that it is laid contiguous with opening 48 which was found not to properly perform the ventilation tasks necessary.

From the foregoing description of the preferred embodiment of the invention it is apparent that many modifications may be made therein. Thus it is intended in the appended claims to cover all such modifications that fall within the true spirit and scope of this invention.

I claim:

1. An enclosed trailer adapted to transport a plurality of stacked cartons containing living fowl, comprising:
    an elongated enclosure defined by a ceiling, a floor, two side walls, a front wall, and a rear opening;
    an elongated opening in said floor; said opening running substantially the entire length of said floor and dividing the floor into approximate equal halves;
    an elongated air duct connected to a source of forced air; said air duct being aligned with and located below and adjacent said elongated opening; said air duct running substantially the entire length of said elongated opening; said air duct having a plurality of holes therein pointed upwardly for forcing air along the middle of the length of the enclosure upwardly from said elongated opening in the floor toward the ceiling;
    the cartons adapted to be stacked and arranged in at least two parallel rows along the length of said elongated opening in said floor; means for maintaining a close spacing between the parallel rows of cartons; said duct providing forced air between such parallel rows of cartons whereby the probability of survival of the fowl during transport is increased.

2. An enclosed trailer as set forth in claim 1 further including a bottom wall on said trailer located below said floor of said enclosure; said bottom wall and said floor forming a housing for said air duct.

3. An enclosed trailer as set forth in claim 2 wherein said means for maintaining a close spacing includes a pair of flanges extending upwardly from said floor along the longitudinal edges of said opening.

4. An enclosed trailer as set forth in claim 2 further including a screen mesh covering said elongated opening.

5. An enclosed trailer as set forth in claim 1 further including means for securing the cartons in a stacked arrangement.

6. An enclosed trailer as set forth in claim 5 wherein said means for securing includes a bar across the top of said cartons and attached to opposing side walls of said enclosure.

* * * * *